United States Patent [19]

Schmidt et al.

[11] Patent Number: 5,150,258
[45] Date of Patent: Sep. 22, 1992

[54] COMBINATION MIRROR AND SUN VISOR

[76] Inventors: William P. Schmidt, 21000 Woodruff, Rockwood, Mich. 48173; Franklin D. Hutchinson, 28000 Beel Rd., New Boston, Mich. 48164

[21] Appl. No.: 678,036

[22] Filed: Apr. 1, 1991

[51] Int. Cl.⁵ .................................................. G02B 5/08
[52] U.S. Cl. ...................................... 359/608; 359/604; 296/97.1; 296/97.6
[58] Field of Search .................. 350/276 R, 277, 278, 350/279, 283; 296/97.1, 97.2, 97.4, 97.7; 359/604, 608

[56] References Cited

U.S. PATENT DOCUMENTS

| | | | |
|---|---|---|---|
| 2,070,434 | 2/1937 | Kangas | 350/283 |
| 2,261,692 | 11/1941 | Manley | 350/283 |
| 3,133,139 | 5/1964 | Beers | 350/276 R |

Primary Examiner—Bruce Y. Arnold
Assistant Examiner—Ryan
Attorney, Agent, or Firm—Weintraub, DuRoss & Brady

[57] ABSTRACT

A combination sun visor and rear view mirror assembly includes a mirror, a mirror housing, and a bracket for attaching the housing to a vehicle. A sun visor panel is pivotally attached to the bracket and is rotatable about the mirror. The visor may be oriented above the mirror, below the mirror, or may be cover the mirror to shield the driver of the vehicle from a direct reflection of the sun. The visor is preferably formed from a tinted, translucent material.

3 Claims, 2 Drawing Sheets

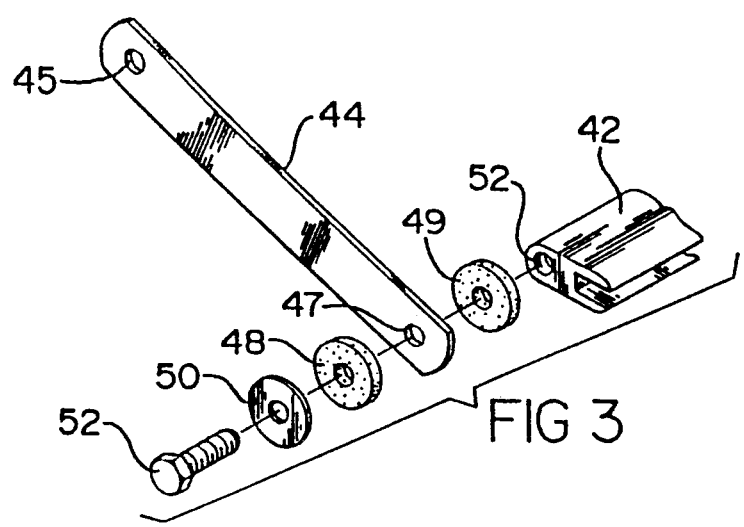
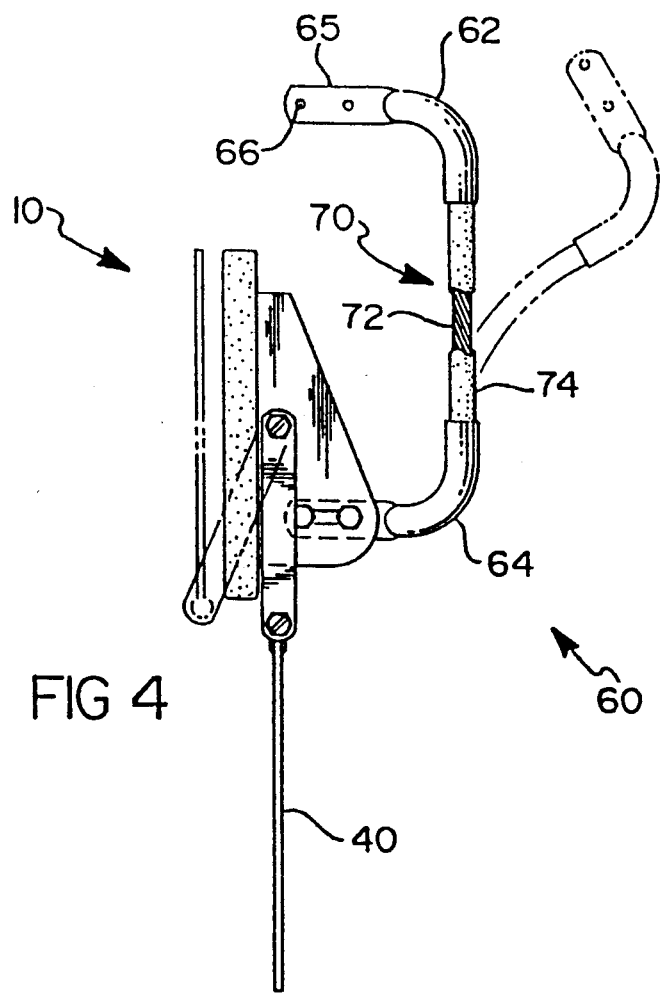

COMBINATION MIRROR AND SUN VISOR

BACKGROUND OF THE INVENTION

1. Field of the Invention

The present invention relates to vehicle accessories. More particularly, the present invention relates to vehicle mirrors. Even more particularly, the present invention relates to a vehicle mirror in combination with a sun visor.

2. Prior Art

Any person acquainted with current day motor vehicles will be aware that virtually every such vehicle on the road today includes a rear view mirror, mounted either to the front windshield or to the roof structure of the vehicle. Most vehicles also include opaque sun visors which may be folded down to block off a portion of the windshield from the rays of the sun. However, there is still generally an exposed area, immediately above and below the rear view mirror, in which no protection by the sun visor is obtainable, and through which a setting or rising sun may shine, causing irritation and glare to a driver of the vehicle. In addition, at times a rising or setting sun, reflecting directly from the rear view mirror into the eyes of a driver, may cause difficulty.

Several patents are known for extensions to the standard opaque sun visor of a vehicle. Summaries of three such patents follow.

Kurvink, U.S. Pat. No. 3,206,244, discloses a sun visor extension which is an elongated, generally rectangular plate or panel of tinted transparent or translucent material. Elastic bands are provided, which pass through holes formed in the panel, for fastening the panel to a standard vehicle sun visor. The panel of Kurvink may generally be extended downwardly from the standard sun visor to provide additional coverage when the sun is lower than the area obtainable by folding the sun visor downwardly without the panel thereon.

Samuelson, U.S. Pat. No. 3,159,421, discloses an automobile sun visor with an auxiliary transparent panel formed as a part of the visor. The auxiliary panel is hingedly attached to the bottom of the standard visor, and may be swung downwardly therefrom to extend the range which is covered by the visor in a manner similar to that of Kurvink.

Janata, U.S. Pat. No. 4,023,855, discloses a translucent glare shield which is a panel attachable to a sun visor to extend the downward or sideways area thereof. The glare shield of Janata uses a plurality of hooks along the edge thereof to attach to a substrate having numerous loops therein which is attached to the standard visor. While the placement of the glare shield of Janata is more adaptable to different conditions then the designs of Kurvink or Samuelson, the shield of Janata is still not placeable above or below the rear view mirror of the vehicle, and cannot be used to protect the eyes of a driver from bright sunlight reflecting in the rear view mirror itself.

SUMMARY OF THE INVENTION

The present invention provides a combination mirror and sun visor in which the visor is movable into a variety of orientations above the mirror, below the mirror, or over the mirror surface to shield the reflection of direct sunlight in the mirror. An apparatus in accordance with the present invention, generally, comprises:

(a) a mirror;
(b) means for mounting the mirror to a vehicle;
(c) a visor panel;
(d) means for mounting the visor to the mirror mounting means; and
(e) means for permitting rotatable movement of the visor about the mirror.

The visor panel is preferably translucent so as to be placeable directly over the mirror surface.

For a more complete understanding of the present invention, the reader is referred to the following detailed description section, which should be read in conjunction with the accompanying drawings. Throughout the following description and in the drawings, like reference numbers refer to like parts throughout the several views, in which:

BRIEF DESCRIPTION OF THE DRAWINGS

FIGS. 3 and 4 illustrate the present mounting arrangement.

DETAILED DESCRIPTION OF THE PREFERRED EMBODIMENT

Figure 2:
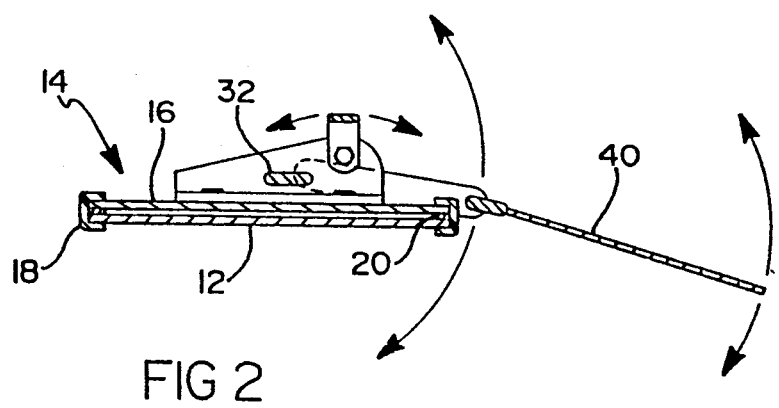
FIG. 2 is a cross-sectional view and partial plan view of the embodiment of FIG. 1, taken along the lines 2—2 of FIG. 1.

Referring to the drawings, a combination mirror and sun visor assembly is shown generally at 10. The assembly 10 includes a generally planar mirror 12 which is of conventional construction. The mirror 12 is stored within a housing 14, which includes a backing plate 16 and an edge molding 18. The backing plate 16 is a generally planar panel, preferably formed from a rigid material such as hard plastic or metal. The backing plate 16 is generally of the same shape and size as the mirror 12. The edge molding 18 completely surrounds the periphery of both the mirror 12 and the backing plate 16, and is substantially U-shaped in cross-section, as shown in FIG. 2. The edge molding 18 may be formed from a resilient material such as a flexible plastic, or may be formed from a semi-rigid material. The edge molding 18 serves to protect a user of the assembly 10 from sharp edges of the mirror 12 and the backing plate 16 and also serves to protect the same edges from damage if they are inadvertently contacted by an object within the vehicle (not shown). The housing 14 may, optionally, contain a gasket 20 formed of a resilient material, between the mirror 12 and the backing 16, as shown.

Figure 1:
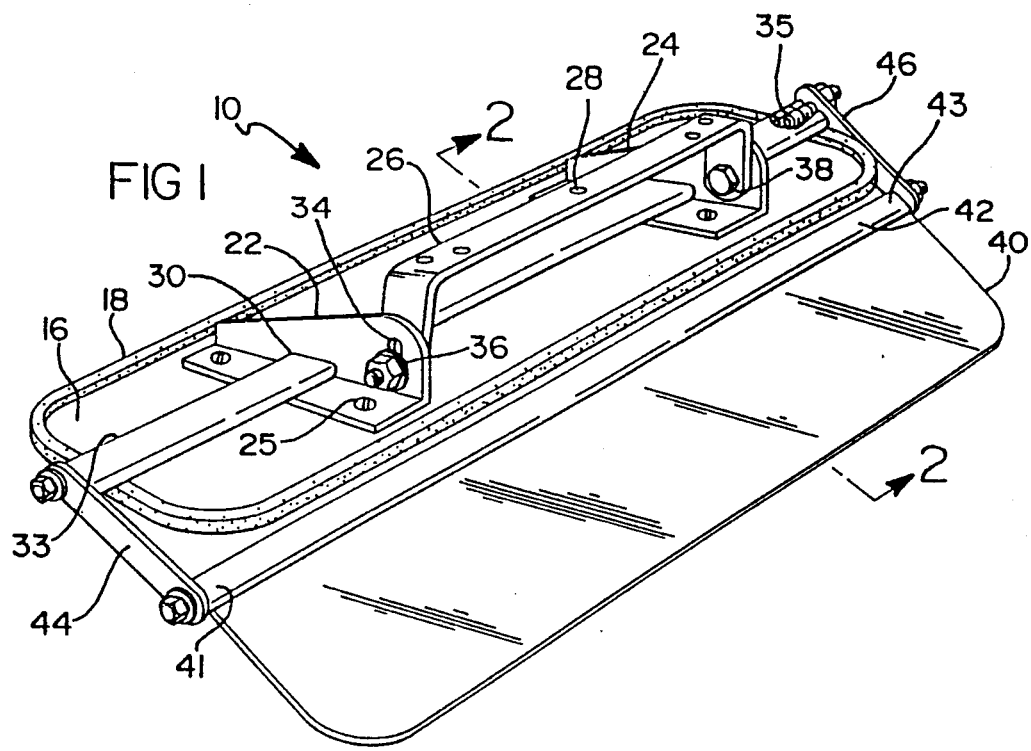
FIG. 1 is a perspective view, partially cut away, of an embodiment of the present invention.

The present invention also contemplates means for mounting the mirror 12 to a vehicle (not shown). The mirror mounting means in the depicted embodiment includes a pair of mounting brackets 22, 24 which are affixed to the backing plate 16, and a connector bar 26 which is pivotally attached to each of the mounting brackets 22, 24, and which interconnects the mounting brackets 22, 24. The connector bar 26 in the depicted embodiment is a flattened bar which is bent in an angle of approximately 90° at each end thereof to form a flattened and elongated U-shape. As shown in FIG. 1, the connector bar 26 may have a plurality of holes 28 formed therethrough to accept conventional threaded fasteners (not shown) therein when the connector bar 28 is attached to a surface of the vehicle (not shown). Suitable fasteners may be screws, sheet metal bolts, or the like. The mounting brackets 22, 24 may be metal brackets which are L-shaped in cross-section and may be attached to the backing plate 16 by rivets 25, as shown, or may be glued or welded to the backing plate 16. Alternatively, the backing plate 16 and brackets 22, 24 may be molded from plastic as a single, integral unit. The mounting brackets 22, 24 are substantially identical to one another, and each includes a horizontal slot 30 formed therethrough to accommodate a support arm 32. Each of the mounting brackets 22, 24 further includes a hole or substantially vertical slot 34 formed therethrough to accommodate means for pivotally attaching the connector bar 26 to the mounting brackets 22, 24. In the embodiment shown, the means for pivotally attaching the connector bar 26 to the mounting brackets 22, 24 comprises a pair of identical nuts 36 and bolts 38.

The support arm 32 is dimensioned to fit through the horizontal slots 30 of the mounting brackets 22, 24. The support arm 32 is formed from a generally rigid material such as metal or plastic and extends outwardly past the housing 14 on each side thereof.

The present invention also includes a visor panel 40 which is a substantially planar panel formed of a translucent material such as plastic or the like. In a preferred embodiment hereof, the visor panel 40 is formed from a tinted, translucent material, and allows the passage of some light therethrough. In the embodiment shown, the visor panel 40 has a reinforcing rib 42 attached thereto along an upper edge thereof for strength and structural support. The reinforcing rib 42 has threaded holes 52 at the ends 41, 43 thereof and a longitudinal groove 45 formed along an edge thereof to receive the visor panel 40 therein, which is glued or otherwise fixed in place. The present invention also includes means for mounting the visor 40 panel to the housing 14, or to the mirror mounting means. In the depicted embodiment, the means for mounting the visor includes the support arm 32 and a pair of substantially identical pivot arms 44, 46 which are rigid, flattened arms which interconnect the visor panel 40 and the support arm 32 at opposite ends thereof, as shown. That is to say, the first pivot arm 44 is pivotally attached at one end thereof to a first near end 33 of the support arm 32 as shown in FIG. 1, and the first pivot arm 44 is attached at the other end thereof to a first end 41 of the reinforcing rib 42 as shown again in FIG. 1. Likewise, the second pivot arm 46 is attached at one end thereof to a second end 35 of the support arm 32, and is attached at the other end thereof to a second end 43 of the reinforcing rib 42.

In the above-described manner, the visor 40 is mounted to the mirror mounting means. Referring now to FIG. 3, the means of attaching the pivot arms 44, 46 to the respective components outlined above is illustrated. Each of the pivot arms 44, 46 has a pair of holes 45, 47 formed therethrough, the holes 45, 47 being at opposite ends of the pivot arm. A plastic washer 48 is disposed on each side of the pivot arm 44 adjacent the hole 47, to provide a contact surface which will allow pivotal motion while providing some resistance to hold the visor 40 in a given orientation until moved. A conventional metal washer 50 is disposed upward of the exterior plastic washer 48, and a bolt 52 or the like passes through each of the washers 48, 49, 50 and is tightened in a female threaded passage 52 which is provided in the end of the support rib 42. The bolt 52 is tightened until there is sufficient resistance to movement of the visor 40 to hold it in place in its orientation with respect to the pivot arm 44 when no pressure is applied, but a visor 40 can still be manually adjusted when pressure is applied thereto. In the embodiment shown, the arrangement of the support arm 32, the pivot arms 44, 46 and the visor panel 40 with the support rib 42, as herein described, provides a means for permitting rotatable movement of the visor about the mirror. The use of the pivot arms 44, 46 allows for a great variety of adjustments of the visor panel 40 with respect to the mirror housing 14. The visor panel 40 may be placed above the mirror to block direct rays of the sun; may be placed below the mirror if the sun is somewhat lower, or may be pivoted around to partly or completely blanket the mirror 12 in order to shield the sun's rays from the eyes of a driver if the rising or setting sun is shining directly in the rear view mirror 12.

Referring now to FIG. 4, a second embodiment of an apparatus in accordance herewith is shown in which the mirror mounting means comprises a pair of flexibly movable adjustment arms 60 which allow for positioning of the mirror assembly 110 when mounted in a vehicle (not shown). Since the adjustment arms 60 are substantially identical, only a single arm 60 is shown in FIG. 4, and it will be understood that another arm is attached to the assembly 110 at the opposite mounting bracket 24 to that shown. Each of the adjustment arms 60 includes a first attachment sleeve 62 and a second attachment sleeve 64. Each of the attachment sleeves 62, 64 is formed from a hollow metal tube which is flattened at an end thereof, the flattened end having one or more holes 66 formed therethrough to accommodate mounting hardware. The adjustment arms 60 in this second embodiment 110 replace the connector bar 26 in the first embodiment 10. Each of the adjustment arms 60 also includes a flexible shaft 70 which interconnects the first and second attachment sleeves 62, 64. The attachment sleeves 62, 64 are crimped on or otherwise attached to the flexible shaft 70. The flexible shaft 70 has a wire or a plurality of wires 72 disposed in the interior thereof, which are surrounded by a sheath 74 which is formed from a resiliently bendable material. The sheath 74 is not required. The first attachment sleeve 62 is attached by suitable mounting hardware such as nuts and bolts, screws, or similar hardware to the roof or other body structure of a vehicle (not shown). The second attachment sleeve 64 is attached by suitable mounting hardware such as that discussed above to the mounting brackets 22, 24 respectively. As shown in phantom in FIG. 4, the bendability of the flexible shaft 70 allows for optimal arrangement and positioning of the mirror assembly 110 to suit a driver's preference.

Also shown in phantom in FIG. 4, is the visor panel 40 positioned directly covering the surface of the mirror 12 in order to protect a driver's vision if the sun is directly reflected in the mirror 12. This is accomplished by pivoting the visor panel 40 on the pivot arms 44 with respect to the mounting brackets 22, 24 and further rotating the visor panel 40 where it attaches to the pivot arms 44 to place it directly over the mirror's surface 12.

Although the present invention has been described herein with respect to a specific embodiment thereof, it will be understood that the foregoing description is intended to be illustrative, and not restrictive. Many modifications of the present invention will occur to those skilled in the art. All such modifications which fall within the scope of the appended claims are intended to be within the scope and spirit of the present invention.

Having, thus, described the invention, what is claimed is:

1. An apparatus for mounting in a vehicle to provide reflection and shade, comprising:
   (a) a mirror;
   (b) means for mounting the mirror to the vehicle, the means for mounting comprising a flexibly deformable adjustment arm;
   (c) a visor panel;
   (d) means for mounting the visor panel to the mirror mounting means; and
   wherein the visor panel mounting means is adjustable to allow placement of the visor to cover the mirror and to alternate positions on opposite sides of the mirror and substantially coplanar therewith.

2. An apparatus for mounting in a vehicle to provide reflection and shade comprising:
   (a) a reflective mirror having a generally planar surface;
   (b) a housing for storing the mirror therein, the housing comprising a backing plate;
   (c) a mounting bracket attached to the backing plate for mounting the apparatus in a vehicle;
   (d) a support arm connected to the mounting bracket for supporting a sun visor;
   (e) a translucent tinted sun visor which extends substantially the entire length of the mirror; and
   (f) a pair of pivot arms which interconnect the sun visor and the support arm; each of the arms being pivotally attached to the sun visor and pivotally attached to the support arm.

3. The assembly of claim 1, wherein the visor panel is formed from a translucent tinted material.

* * * * *